INVENTORS
WILLIAM J. RATTMAN
FRANK R. WASSON, JR.
GORDON C. MacKENZIE

United States Patent Office 3,669,540
Patented June 13, 1972

3,669,540
OPTICAL DEPTH FINDER AND ELEMENTS THEREFOR
William J. Rattman, Needham, Frank R. Wasson, Jr., Chelmsford, and Gordon C. MacKenzie, North Billerica, Mass., assignors to Raytheon Company, Lexington, Mass.
Filed Aug. 31, 1970, Ser. No. 68,206
Int. Cl. G01c 3/08; G02b 27/28
U.S. Cl. 356—4                                    7 Claims

ABSTRACT OF THE DISCLOSURE

An improved optical depth finder, and elements therefor, for depth sounding and detection of submerged targets from an airborne vehicle. The disclosed system uses a coherent beam of polarized light from a laser directed downwardly toward the surface of a body of water and processes the polarized surface specular reflected energy, energy reflected by submerged targets within the beam, and energy reflected by the bottom of the body of water to derive the desired information. Means are provided selectively to attenuate the reflected energy in accordance with the particular source thereof so as to permit the dynamic range of the processor of the reflected energy to be reduced and the system to be used when the height of the airborne vehicle changes or condition of the water varies.

---

The invention herein described was made in the course of or under a contract or subcontract thereunder, with the Department of Defense.

BACKGROUND OF THE INVENTION

This invention relates generally to laser depth measuring systems and particularly to optical filters used in the receivers of such systems.

Laser depth measuring systems using pulses of light are known for the rapid accurate sounding of the depth of a body of water, as the ocean, and for the detection of submerged objects. The depth of the ocean or of the submerged object is generally determined by measurement of the interval between the detection of the energy reflected from the ocean surface and the energy reflected from the ocean floor or from the submerged object. When such a system is displaced from the ocean surface, as when it is used on board a helicopter, the altitude of such helicopter is determined by measurement of the interval between the time of transmission of each laser pulse and the time of detection of the resulting energy reflected from the ocean surface.

The power of the reflected return varies greatly in magnitude as the transmitted pulse is first reflected by the ocean surface, then ocean medium and any submerged target therein, and finally the ocean floor. While the absolute magnitude of such power varies with aircraft altitude, ocean surface roughness and ocean depth, under any condition an extremely large relative difference in amplitude of reflected energy is encountered. For example, the predominantly specular reflections from the ocean surface produce signals which may 70 db greater than signals resulting from reflections from points imdiately below the ocean surface and may be 90 db greater than signals caused by reflections from the ocean floor. These characteristics place stringent requirements on the dynamic range of the receiver. In particular, if a photomultiplier is used as the photodetector of the receiver, reflections from the ocean surface may saturate the photomultiplier, thereby preventing soundings from being made or submerged targets from being detected. This equivalent saturation phenomenon occurs if a photodiode-amplifier combination is used as the receiver photodetector.

One approach to the solution of this problem has been "range gating," that is, a plurality of photodetectors are employed, each one of such photodetectors having a different sensitivity, in combination with gating logic wherein the photodetector of proper sensitivity is activated at the proper time to thereby detect the various returns. Such a system is complicated and expensive.

A second approach to the solution of this problem is to place an optical filter in the focal plane of the receiver, the center portion of the filter being of sufficient optical density to greatly attenuate the relatively large power of the reflected returns from the ocean surface. However, because of the density required of such center portion, the measurement of shallow ocean depths may be prevented.

SUMMARY OF THE INVENTION

It is, therefore, an object of the invention to provide an improved laser depth sounding system.

It is another object of the invention to process reflected energy of a laser depth sounding system so that specular reflections from the surface of the measured medium are selectively attenuated.

It is another object of the invention to provide a filter to attenuate more greatly backscatter reflections from points nearer the surface of the measured medium than backscatter reflections from points near the bottom of the measured medium.

These and other objects of the invention are generally accomplished by combining means for directing a beam of coherent polarized light from a laser and means, including a polarized filter in cross-polarized relationship to the substantially polarized energy resulting from specular reflections from the ocean surface, for selectively attenuating such surface specular reflections prior to their detection by the receiver photodetector. In addition, an optical wedge is disposed in the path of the reflected energy, the optical density and related energy attenuation factor of such wedge decreasing from its center portion to its peripheral section so as selectively to attenuate reflections form points nearer the ocean surface to a greater degree than reflections from points nearer the ocean bottom.

BRIEF DESCRIPTION OF THE DRAWINGS

For a better understanding of the present invention reference should now be made to the following description taken in connection with the accompanying drawings in which.

DESCRIPTION OF THE PREFERRED EMBODIMENT

Figure 1:
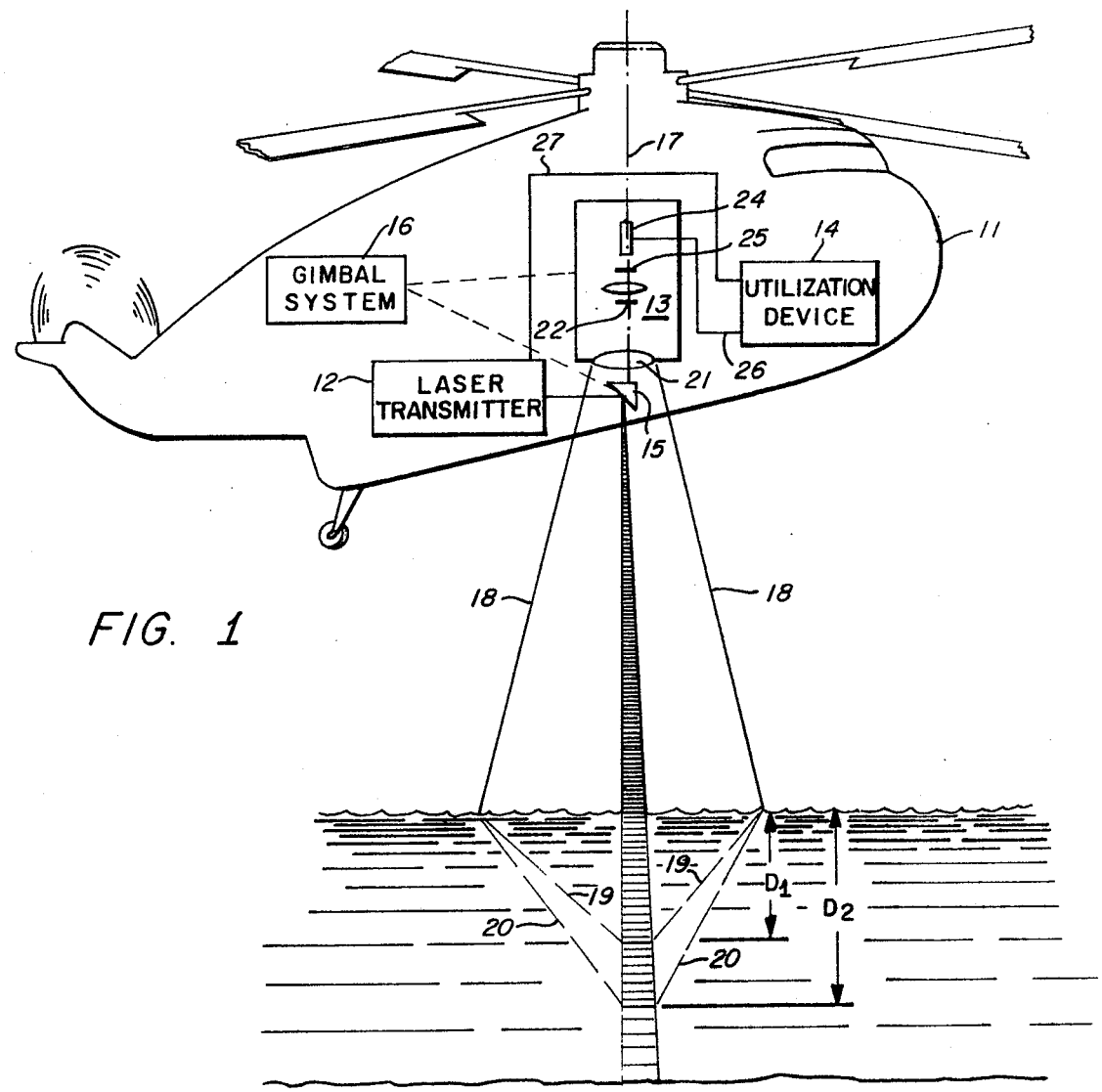
FIG. 1 is a presentation of an airborne laser ocean depth sounding system greatly simplified in order to show the principles of the invention.

FIG. 1 shows a laser depth sounding system carried within an airborne vehicle 11, here shown as a helicopter, for use in oceanographic survey. The depth sounding system comprises a laser transmitter 12, a laser receiver 13 and a utilization device 14. The laser transmitter 12, here a Q-switched frequency doubled yttrium aluminum garnet device of sufficient power considering the depth of the ocean, produces a linearly polarized coherent laser beam (not numbered) of transmission wavelength $0.53\mu$, such wavelength being near the peak of the ocean transmission "window." Such laser beam is reflected by transmitter mirror 15 so that it is transmitted along a path substantially orthogonal to the ocean surface. Such orthogonal attitude is maintained by mounting the laser transmitter 12, the transmitter mirror 15 and the laser receiver 13 on a common platform (not shown), such platform being gimballed with respect to airborne vehicle 11 by gimbal system 16. The transmitter mirror 15 is disposed in proper orientation to the receiver boresight axis 17 so that the laser beam (after reflection from transmitter mirror 15) and the receiver boresight axis 17 are essentially coaxial. The transmitter mirror 15 is small relative to the receiver collecting aperture.

The energy in the transmitted beam is partially reflected first by the ocean surface, then the ocean medium (including any submerged targets, not shown) and finally by the ocean floor. The maximum field of view of the receiver 13 is herein represented by lines 18. In order for detection by receiver 13 of subsurface backscatter reflections occurring at depth $D_1$ and greater depth $D_2$, such subsurface reflections must propagate towards the receiver and be refracted by the wave facets at the ocean surface so as to be within the field of view of the receiver. While such backscatter reflections propagate in many directions, the reflection at depths $D_1$ and $D_2$ which are within the maximum field of view of the receiver are represented by lines 19 and 20 respectively. It is noted that the amount of refraction at the ocean surface required for backscatter reflections at depth $D_1$ to be within the maximum field of view of the receiver is larger than that amount of ocean surface refraction required at greater depth $D_2$. Since large ocean surface refraction will occur with large wave facet slopes, and since the probability for smaller wave facet slopes is greater, the greatest amount of reflected energy from shallow targets is collected at the receiver near the receiver boresight axis 17, while a correspondingly greater percentage of reflected energy from greater depths will be collected further off the receiver boresight axis 17. That is, the field of view in the focal plane of the receiver is smaller for subsurface backscatter returns occurring near the ocean surface as compared with reflections near the ocean bottom.

It is also noted that the polarized transmitted pulse reflected by the ocean surface remains also essentially polarized. In other words, the specular surface reflections are substantially linearly polarized energy. The backscatter reflections occurring immediately below the surface of the ocean are essentially non-polarized.

The various reflected returns, as described in detail above, are collected by the receiver collecting optics 21, herein represented by a lens, whereby such reflected returns are focused at the receiver focal plane. An optical filter 22, such filter being described in more detail hereinafter, is disposed in such focal plane as indicated. The filtering surface of the optical filter 22 is disposed essentially orthogonal to the receiver boresight axis 17, such boresight axis passing through the center portion of the filtering surface. The function of optical filter 22 is to compress the dynamic range of the various reflected returns. The center portion of the optical filter is used to greatly attenuate specular reflections and subsurface backscatter reflections from immediately below the ocean surface since such reflections predominate the center portion of the filter. Subsurface backscatter reflections from nearer the ocean floor are less greatly attenuated by the optical filter 22 than those reflections from near the ocean surface.

Field lens 13 converges the reflected returns filtered by optical filter 22 on the photomultiplier 24. A narrow band filter 25, of conventional design, passes only electromagnetic energy in a narrow spectrum centered at the laser transmitter wavelength, herein $0.53\mu$. The electrical signal developed by photomultiplier 24 is transmitted to utilization device 14 by transmission line 26. Utilization device 14, here being a time interval counter, may be any known time/distance measuring device known in the art. By measuring the time interval between the initial signal it receives from the photomultiplier 24, representing ocean surface reflections, and the termination of the signal from the photomultiplier, the ocean depth can be determined since the speed of the laser energy in the ocean medium is about 2.72 ns./ft. for a $0.53\mu$ operating wavelength. Utilization device 14 also receives a signal from laser transmitter 12, such signal occurring at the initiation of the transmitted pulse and such signal being transmitted to utilization device 14 by transmission line 27. The interval between the signal from the laser transmitter 12 to the utilization device 14 and the beginning of the reflected signal is used to determine the altitude of airborne vehicle 11.

Figure 2:
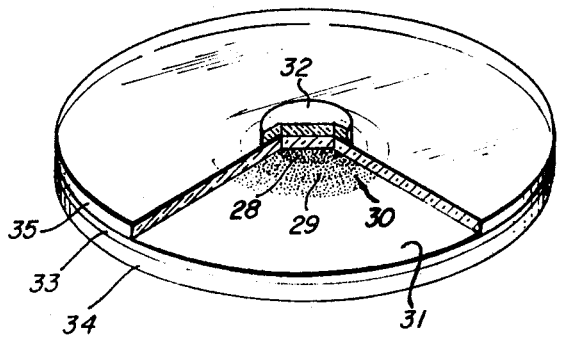
FIG. 2 is a sketch of a polarized optical wedge, partially broken away and somewhat distorted, to show the construction thereof.

FIG. 2 shows optical filter 22. Optical filter 22 is a disc-shaped element comprised of a photographic film 33 sandwiched between glass plates 34 and 35. Cemented to the outer portion of glass plate 35 is a disc 32 of linearly polarized material. The photographic film 33 has formed thereon a plurality of concentric rings 28, 29, 30 and 31, each such ring being less dense so that the film has a greater optical density at its center.

In reference to FIG. 1, the linearly polarized disc 32 is oriented in cross-polarized relationship to the linearly polarized energy resulting from specular reflections at the surface of the ocean.

It will be obvious to one of ordinary skill in the art that the graded optical density of the photographic film need not be made up of a plurality of concentric rings but can be a continuous graded density. It is also noted that a polarized material could be formed with a more optically dense center portion than the peripheral portion to thereby form optical filter 22 in one unit. Also, the polarizer could be separate from the graded density filter. In any practical deployment a series of polarized optical filters, as herein described, would be on board the aircraft, each one suitable for a particular set of possible wind, altitude and ocean conditions. It is therefore understood that the invention is not limited to the specific embodiment as shown, but only by the spirit and scope of the appended claims.

What is claimed is:

1. A unidirectionally polarized optical wedge.

2. For use in a laser depth measuring system wherein substantially polarized electromagnetic specular reflections from the surface of a body of water are collected within a receiver, the combination comprising:
   (a) a disc fabricated from a polarized material, such disc being disposed in the receiver to attenuate the polarized electromagnetic specular reflections; and
   (b) a photodetector responsive to such attenuated reflections.

3. For use in a laser depth measuring system wherein electromagnetic reflections from a body of water are collected within the field of view of a receiver, such collected electromagnetic reflections being comprised of substantially polarized electromagnetic energy resulting from specular reflections at the surface of the body of water, such substantially polarized energy being concentrated at the center of the field of view of the receiver, and substantially nonpolarized electromagnetic energy resulting from backscatter reflections beneath the surface of the body of water, the intensity of such substantially nonpolarized energy decreasing from the center of the field of view of the receiver to the periphery thereof, the combination comprising:
   (a) an optical wedge, such optical wedge having a greater optical density at the center portion than at the peripheral portion, such center portion being disposed at the center of the field of view of the receiver, for selectively attenuating the intensity of the nonpolarized energy;
   (b) a disc, fabricated from a polarized material, such disc being disposed in the field of view of the receiver for attenuating the polarized energy; and (c) a photodetector responsive to the selectively filtered nonpolarized electromagnetic energy and the attenuated electromagnetic energy.

4. For use in a laser depth measuring system wherein electromagnetic reflections resulting from illumination of a body of water by a polarized beam from a laser are collected within a field of view, such collected electromagnetic reflections being comprised of substantially polarized electromagnetic energy specularly reflected from the surface of the body of water, such substantially polarized energy being concentrated at the center of the field of view, and substantially unpolarized electromagnetic energy backscattered from points beneath the surface of the body of water, such unpolarized energy being concentrated in the peripheral portion of the field of view, the combination comprising:
   (a) a disc, fabricated from a polarized material, such disc being disposed in the field of view selectively to attenuate the intensity of polarized energy and to pass, substantially unattenuated, the unpolarized electromagnetic energy; and,
   (b) a photodetector responsive to the portion of the electromagnetic reflections passed through the disc.

5. A unidirectionally polarized optical wedge, such wedge having an optical density decreasing from its center portion to its peripheral portion and a linear polarization.

6. A polarized optical wedge, such wedge having a unidirectionally linear polarization, and having an optical density which decreases from its center portion to its peripheral portion.

7. A unidirectionally polarized optical wedge, such wedge having a linear polarization and formed thereon a series of concentric rings, the optical density of each one of the series of rings decreasing from the centrally disposed ring to the peripherally disposed ring.

References Cited
UNITED STATES PATENTS

| | | | |
|---|---|---|---|
| 3,437,401 | 4/1969 | Siksai | 350—153 |
| 3,446,555 | 5/1969 | Kahn | 356—5 |
| 3,409,368 | 11/1968 | Fernandez | 356—5 |
| 3,465,347 | 9/1969 | Hudson | 350—314 |

OTHER REFERENCES

Sears, optics, 1949, 3rd edition, pp. 39–43.

BENJAMIN A. BORCHELT, Primary Examiner

S. BUCZINSKI, Assistant Examiner

U.S. Cl. X.R.

350—153, 314; 356—3, 5, 119